United States Patent
Branson et al.

(10) Patent No.: US 8,474,053 B2
(45) Date of Patent: Jun. 25, 2013

(54) DATA SECURITY IN A MULTI-NODAL ENVIRONMENT

(75) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/794,870

(22) Filed: Jun. 7, 2010

(65) Prior Publication Data

US 2011/0302659 A1     Dec. 8, 2011

(51) Int. Cl.
*H04L 29/06*     (2006.01)
(52) U.S. Cl.
USPC .................. 726/26; 726/4; 726/14; 709/200; 709/224; 713/152; 713/164
(58) Field of Classification Search
USPC ............................................ 726/26; 709/224
See application file for complete search history.

(56) References Cited

U.S. PATENT DOCUMENTS

| | | | |
|---|---|---|---|
| 6,195,694 B1 * | 2/2001 | Chen et al. | 709/220 |
| 6,389,543 B1 * | 5/2002 | Dawson et al. | 726/4 |
| 2006/0179296 A1 * | 8/2006 | Bartlett et al. | 713/152 |
| 2007/0271234 A1 * | 11/2007 | Ravikiran | 707/3 |
| 2009/0138938 A1 * | 5/2009 | Harrison et al. | 726/1 |

* cited by examiner

*Primary Examiner* — Taghi Arani
*Assistant Examiner* — Jason Lee
(74) *Attorney, Agent, or Firm* — Martin & Associates, LLC; Bret J. Petersen

(57) ABSTRACT

A data security manager in a multi-nodal environment enforces processing constraints stored as security relationships that control how different pieces of a multi-nodal application (called execution units) are allowed to execute to insure data security. The security manager preferably checks the security relationships for security violations when new execution units start execution, when data moves to or from an execution unit, and when an execution unit requests external services. Where the security manager determines there is a security violation based on the security relationships, the security manager may move, delay or kill an execution unit to maintain data security.

6 Claims, 6 Drawing Sheets

Security Relationship Records

| EU ID | EU Relationship(s) | Time Relationship | Data Relationship | Service Relationship |

410, 412, 414, 416, 418

DATA SECURITY IN A MULTI-NODAL ENVIRONMENT

BACKGROUND

1. Technical Field

This disclosure generally relates to computer systems, and more specifically relates to data security in a multi-nodal computer system environment.

2. Background Art

Distributed computing systems are increasingly being employed to overcome the limitations of traditional applications deployed in standard computing systems. A distributed computing system consists of multiple autonomous computers or nodes that communicate through a network. Distributed computing refers to the use of distributed systems to solve computational problems. In distributed computing, a problem is divided into many tasks, each of which is solved by one or more computer nodes. Distributed computing in a multi-nodal environment takes on many forms and can be exemplified by several of today's most promising computing technologies such as IBM® Corporation's Blue Gene®, grid computing, commercial clusters, and IBM® Corporation's RoadRunner. These new multi-nodal environments allow individual computer execution units to be linked to each other thru new programming paradigms such that a unit of work or a typical program is parsed out and computed in a distributed manner. Furthermore this spread of work is often left up to the system such that software designers have little or no way of knowing what pieces of the puzzle are running where.

In the typical application development environment, data security is implemented at an object level. An application depends on having access to certain objects based on the security rules/roles and setup implemented at both the operating system and database level. While security based on access to objects works fairly well in traditional computer systems, it does not address the security requirements of protecting data and allowing flexibility in accessing data in these more complex multi-nodal environments.

BRIEF SUMMARY

The disclosure and claims herein are directed to data security in a multi-nodal environment. A multi-nodal security manager enforces processing constraints stored as security relationships that control how different pieces of a multi-nodal application (called execution units) are allowed to execute in order to insure data security. The security manager preferably checks the security relationships for security violations when new execution units start execution, when data moves to or from an execution unit, and when an execution unit requests external services. When the security manager determines there is a security violation based on the security relationships, the security manager may move, delay or kill an execution unit to maintain data security.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Described herein is a multi-nodal security manager that enforces processing constraints stored as security relationships to control how different pieces of a multi-nodal application are allowed to execute in order to insure data security. The security manager preferably checks the security relationships for security violations when new execution units start execution, when data moves to or from an execution unit, and as an execution unit requests external services. When the security manager determines there is a security violation based on the security relationships, the security manager may move, delay or kill an execution unit.

Figure 1:
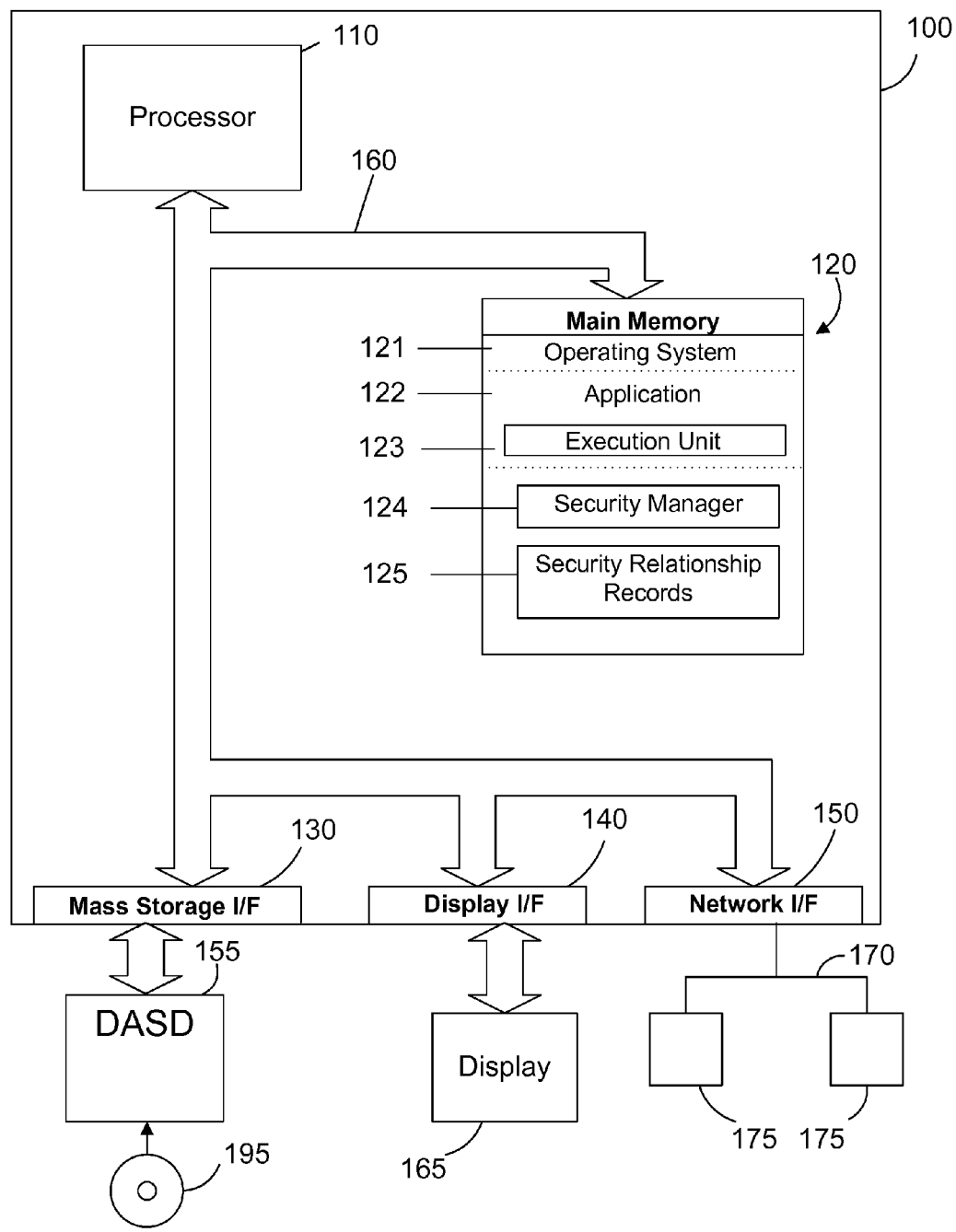
FIG. 1 is a block diagram a computer system with a security manager utilizing security data records as described herein.

Referring to FIG. 1, a computer system 100 is one suitable implementation of a computer system that includes a security mechanism as described herein. Computer system 100 is an International Business Machines Corporation (IBM®) Power System which can run multiple operating systems including the IBM® i operating system. However, those skilled in the art will appreciate that the disclosure herein applies equally to any computer system capable of being connected in a multi-nodal computing environment. For example, the computer system 100 could also represent a single node of a massively parallel computer such as IBM® Corporation's Blue Gene® developed by IBM®, or a node of a scalable performance cluster such as a Beowulf cluster. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195.

Main memory 120 preferably contains an operating system 121. Operating system 121 is a multitasking operating system known in the industry as IBM® i operating system; however, those skilled in the art will appreciate that the spirit and scope of this disclosure is not limited to any one operating system. The memory further includes a software application 122 that comprises one or more execution units 123. The memory includes a multi-nodal security manager 124 as described herein. The memory includes security relationship records 125 that holds one or more security relationships for the execution units that are used by the security manager 124 as described herein.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, application 122, security manager 124 and security data records are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the application 122 and the execution unit(s) 123.

Although computer system 100 is shown to contain only a single processor and a single system bus, those skilled in the art will appreciate that a security manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
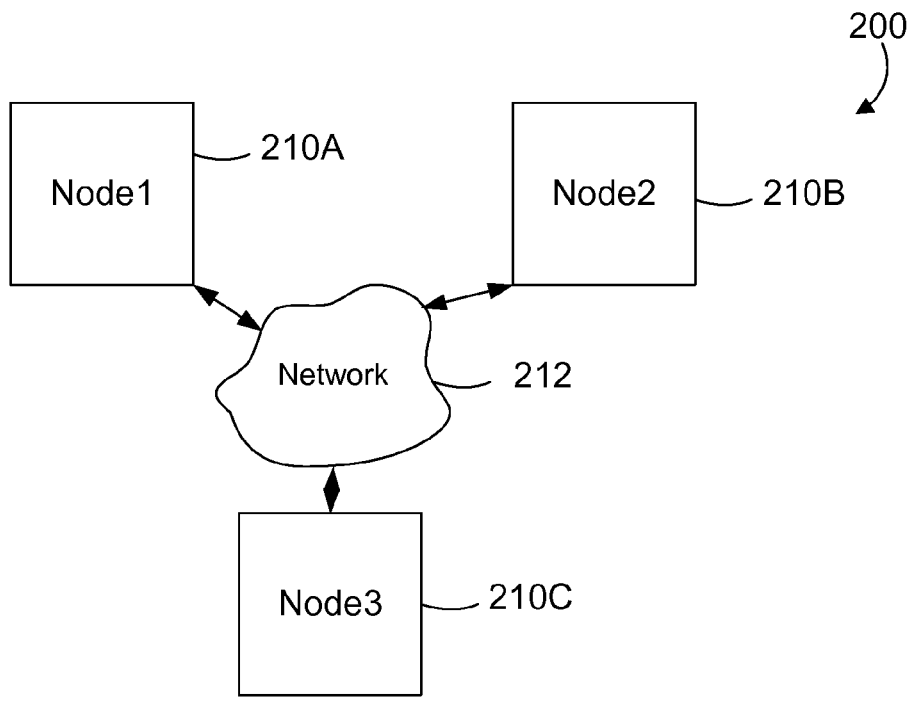
FIG. 2 is a block diagram that illustrates three compute nodes connected in a generic multi-nodal computer environment.

FIG. 2 illustrates a block diagram of a generic multi-nodal computer environment 200. The multi-nodal computer environment 200 is shown with three nodes 210A, 210B, 210C connected with a network 212. The network 212 can be any suitable network to connect the nodes 210 for distributed computing. Each node may represent a computer 100 with some or all the hardware, and memory components as shown in FIG. 1. Alternatively, each node of the computer system 200 could also represent a single node of a massively parallel computer such as IBM® Corporation's Blue Gene®developed by IBM®, or a node of a scalable performance cluster such as a Beowulf cluster. Each node preferably includes a security manager 124 (FIG. 1) that utilizes security relationships records 125 (FIG. 1) to manage data security in a multi-nodal environment as described and claimed herein.

Figure 3:
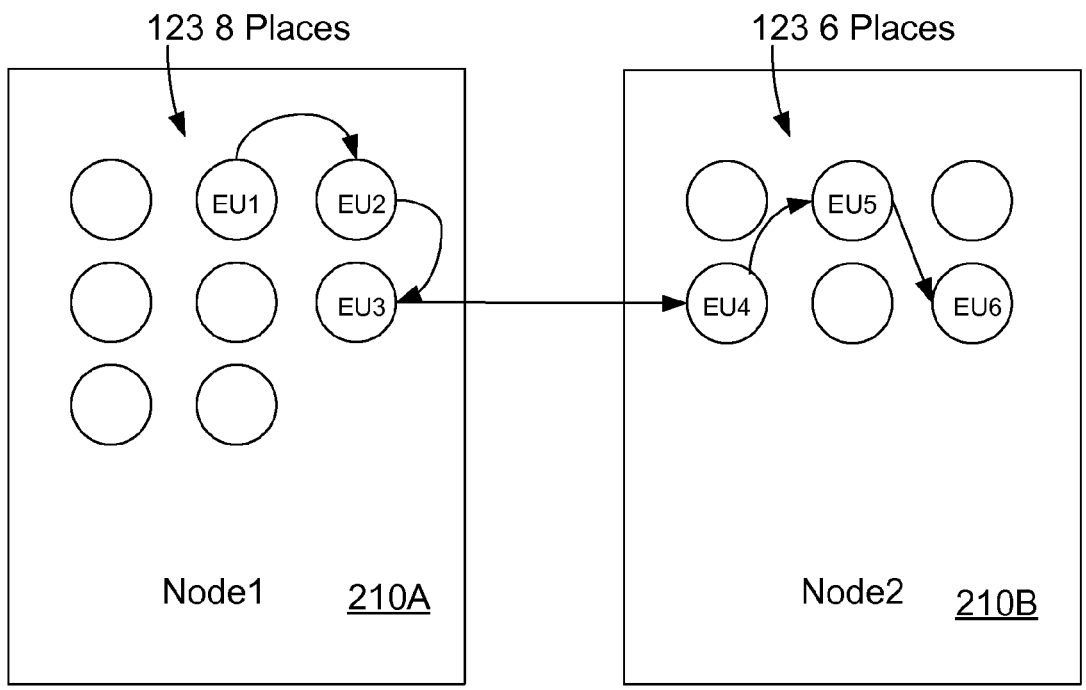
FIG. 3 is a block diagram that shows data relationships between execution units on two compute nodes.

FIG. 3 is a block diagram that shows data flow between execution units 123 and the relationship of execution units on two compute nodes 210A, 210B. In this simple example, Node1 210A has 8 execution units 123 and Node2 210B has 6 execution units 123 currently executing on the nodes. Execution units EU1 through EU6 may collectively represent an application as it executes and passes data either on a single node or multiple nodes. The arrows between the execution units 123 indicate the flow of data. Thus data from EU1 flows to EU2 and then to EU3. Data coming into an execution is processed such that the data flowing to the next execution unit may be different. Thus as illustrated in FIG. 3, an execution unit may be related to execution units on the same node or different nodes.

The security manager described herein is capable of providing security of data between execution units on one or more nodes of the distributed computer system environment. The security is not limited to security between execution units on the same node, but may also be provided between execution units on different nodes of the same type, execution units on the same trunk (set or group of nodes), execution units on the same physical or logical machine, or machines at the same physical location, etc. The security manager may also enforce security for execution units across an internet protocol suite (commonly know as TCP/IP). This would allow security across a range of IP addresses or a set of nodes based on their IP addresses. The security manager herein is capable of providing security in a distributed environment that may be a complete multi-nodal computer system or some portion of that system. The relevant portion of the computer system may be a combination of nodes, trunks, logical and physical machine breakdowns, locational breakdowns and IP breakdowns of a computer, where a breakdown is some logical or physical partitioning of the system. Node1 210A and Node2 210B shown in FIG. 3 can thus be considered to be nodes in any one of these distributed environments.

Figures 4, 5:
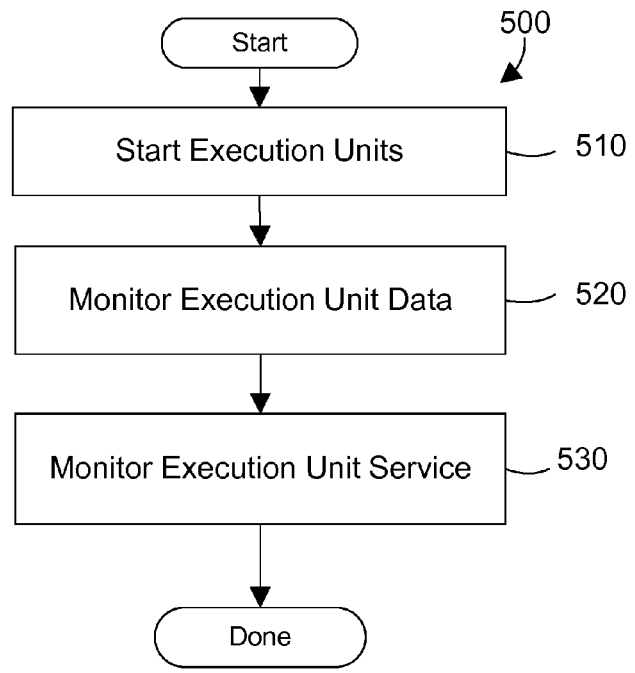
FIG. 4 is a block diagram that shows an example of a security relationships records file.
FIG. 5 is a method flow diagram for a security manager for a multi-nodal computer environment as claimed herein.

FIG. 4 illustrates a table that represents one suitable implementation of security relationship records 125 used by the security manager 124. The security relationship records 125 may be a file of records stored in memory or in a data storage device. The security relationship records 125 include records of security relationships for an associated execution unit. In the illustrated example, the security relationship records 125 includes a number of security data relationships, where each data record includes an execution unit identifier (ID) 410, and one or more EU relationships 412. The EU relationships 412 identify one or more execution units that have a relationship with the execution unit identified by the execution unit ID 410. Thus together the EU ID 410 and the EU relationships 412 identify the execution units that share the relationships for each record. Next, there are one or more relationships related to the respective execution unit identified by the unit identifier 410 and the units or nodes identified in the EU relationships 412. The relationships in the data record may include for example one or more of the following: a time relationship 414, a data relationship 416 and a service relationship 418. The security relationships 412 may be expressed in any suitable format to show a logical condition between the relevant entities in the manner described below.

We will now consider some examples of security relationships that may be stored in the security relationship records 125 in FIG. 4. In a first example, we assume there is an execution unit A that is allowed to run on the same node as execution unit B but they should not be allowed to run at the same time. This security relationship could be set up as a time relationship 414. Thus a record would be created with the execution unit ID 410 set for execution unit A and an EU relationship 412 set for execution unit B. The created records would include a time relationship 414 with logic set to allow execution unit A and execution unit B to be in the same node but not execute simultaneously. The time relationship 414 record could be expressed as a logical condition in the form of: "Execution unit A: Execution unit B: same node: time period x". For this example the time relationship would have a time period "x" equal to zero such that the time relationship 414 indicates that execution unit A cannot run concurrently with execution unit B. Alternatively, the time relationship 414 could be set up with logic that would not allow execution unit A to run within some set amount of time of execution unit B. The time relationship 414 could be for example simply an amount of time that must be enforced between running the execution units. The relationships contemplated herein are not limited to relationships between two execution units, but may extend to relationships covering a plurality of execution units. Likewise the relationship could cover a plurality of nodes or any logical or physical division of hardware. The disclosure and claims herein expressly extend to other relationships of time and relevant portions of the system described above.

In another example, there may be a security relationship were we want to allow execution unit A and execution unit B to run at the same time as long as they are not annotated with certain pieces of metadata. For example, we assume processing unit A contains information about social security numbers and execution unit B has address and name information. We would not want these units to be running at the same time (having all this information together on a single node at the same time may significantly increase our security exposure), but if they were to run X amount of time apart, it would be allowable. For this example, a data relationship record 416 could be expressed as a logical condition in the form of: "Execution unit A: Execution unit B: same node: time period 0: Dataxyz". For this example the data relationship would have a time period "o" that indicates that execution unit A can run concurrently with execution unit B where they do not access data "Dataxyz".

In yet another example, the security manager would move, delay or kill execution units based on a service request or use of a service by the execution unit. In this example, the security manager would use a service relationship 418 in the security data record 125 that sets up a logical condition for data. For example, while execution unit A is processing social security numbers it is accessing certain information from database files, and at the same time execution unit B is processing name and address information in the same database files. The security manager may be set up to move, delay or kill the execution of one execution unit based on a logical condition set up in the service relationship 418. The security manager would then follow the logical condition in the service relationship to move delay or kill an execution unit. The security manager could delay running the execution unit until certain service conditions are met. In this example, execution unit A and execution unit B on one node would not be allowed to make a service request to access both the social security system and the general personal information system at the same time. The execution unit would be moved, delayed or killed to prevent the security violation. As used herein, a service relationship is a logical condition concerning the state of the execution unit related to an external service request such as an HTTP request, a socket call, a database call, function call or other service call to acquire data from or send data to an outside source.

In the examples described above, if the execution unit violates the security relationship described in the relationship record, the security manager would then determine how to prevent the security violation. The security manager could prevent the security violation by moving, delaying or killing the execution unit. For example, if the security violation is a violation of the time relationship 414, the security manager could delay the execution unit a sufficient amount of time until the time relationship 414 is satisfied. Similarly, if the security violation is a data violation, the security manager could move the execution unit, perhaps with any data associated with the execution unit, to another node that would not violate the security relationship. If the execution unit cannot be delayed or moved to overcome the security violation, then the security manager would then kill the execution unit and log a security violation within the security manager and/or at another appropriate place within the system.

In the example described above, the security manager is shown to detect security violations of time, data and services. In addition, the security manager could detect a combination of these conditions to determine a security violation and respond in a similar manner as described above. For example, there may be a condition where it is acceptable for two execution units to run within a given time period of each other, but not run within that time period and access a specific service. In this situation, a combination security relationship record with both a time relationship and a service relationship would be set up in the security relationship records 125. This combination relationship could be stored separately (not shown) or stored as a time relationship 414 or a service relationship 418 (FIG. 4). Other combinations of the above could also be set up for the security manager.

FIG. 5 shows a method 500 for a security manager as claimed herein. The steps in method 500 are preferably performed by the security manager 124 (FIG. 1), but portions of the method may also be performed by other software associated with the computer system. First, start or run each of the execution units in the system while insuring each new execution unit that is started does not violate security relationships in the security relationship records (step 510). Next, monitor the execution unit data that flows in and out of the execution units to detect security violations based on the data relationships in the security relationship records (step 520). Then monitor the execution unit's use of services to detect security violations based on the service relationships in the security relationship records (step 530). The method is then done. Each of these steps is further described in the paragraphs below.

Figure 6:
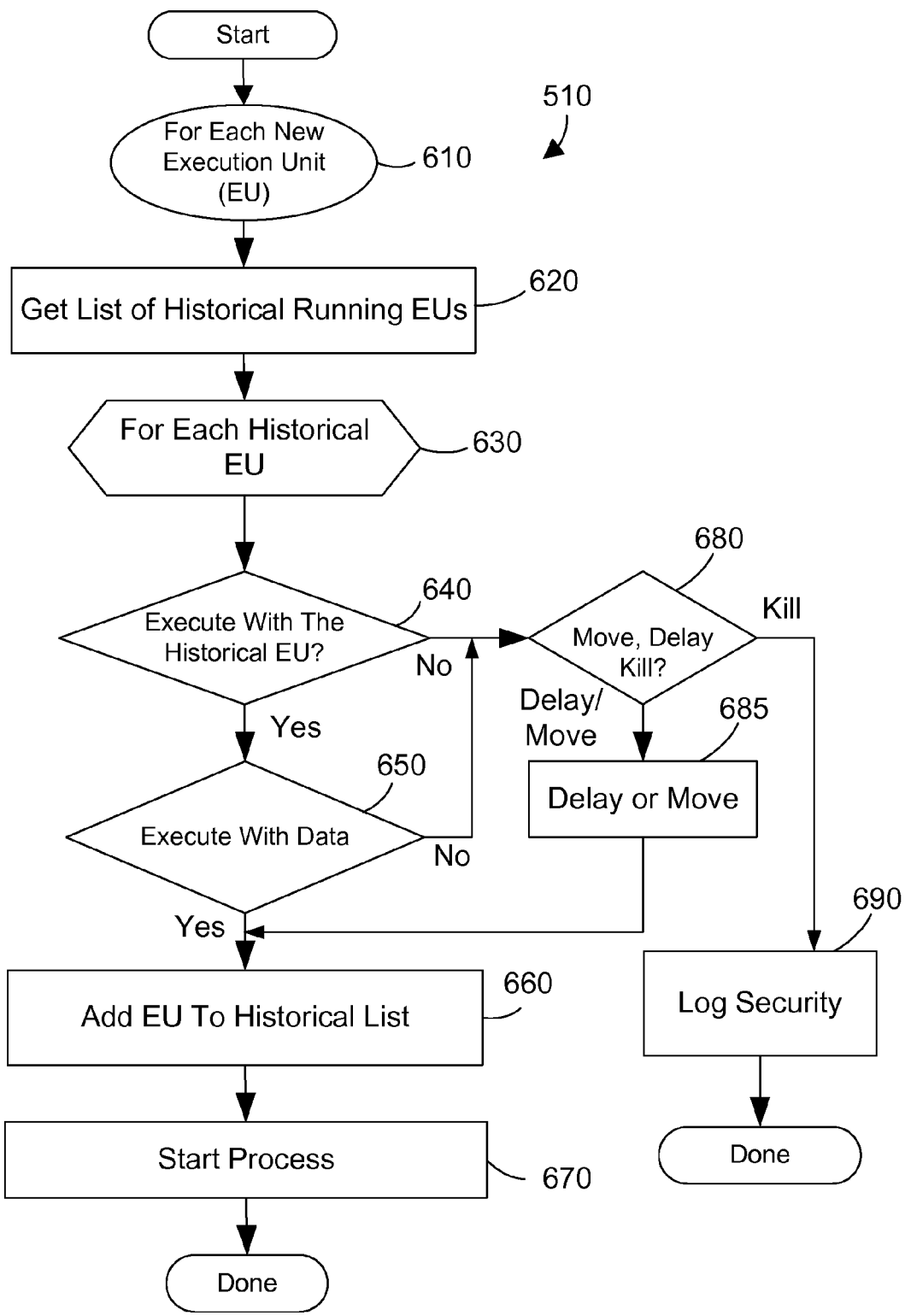
FIG. 6 is an example of a method flow diagram for starting execution units according to step 510 in FIG. 5.

FIG. 6 shows a method 510 for starting execution units on the multi-nodal computer system. Method 510 is an example of performing the step 510 in FIG. 5 according to the examples described in the previous paragraph. The steps in method 510 are preferably performed by the security manager 124 (FIG. 1), but portions of the method may also be performed by other software associated with the computer system. Method 510 is performed for each new execution unit that is started on the relevant multi-nodal system where security is being monitored by the security manager (step 610). The method gets a historical list of execution units (step 620). The historical list is a list of all currently running execution units and all execution units that have run within a relevant time, such as within the time period of a time relationship (414 in FIG. 4). The method then performs the remainder of the steps for each of the execution units in the historical list (step 630). First, check the security data records to determine if the new historical unit can execute with each historical execution unit (step 640). If the new execution unit can run with the historical unit (step 640=yes) then check the security data records to determine if the new execution unit can run with existing data (step 650). If the new execution unit can execute with the existing data (step 650=yes) then add the new execution unit to the historical list (step 660) and start the process of the new execution unit (step 670). The method is then done. If the new execution unit can not run with the historical unit (step 640=no) or if the new execution unit can not execute with the existing data (step 650=no) then determine whether to move, delay or kill the new execution unit (step 680). If the new execution unit can be delayed (step 680=delay) then delay a period of time (step 685) and then go to step 660. If the new execution unit can not be delayed or should be killed (step 680=kill) then log the security violation (step 690) and then the method is done.

Figure 7:
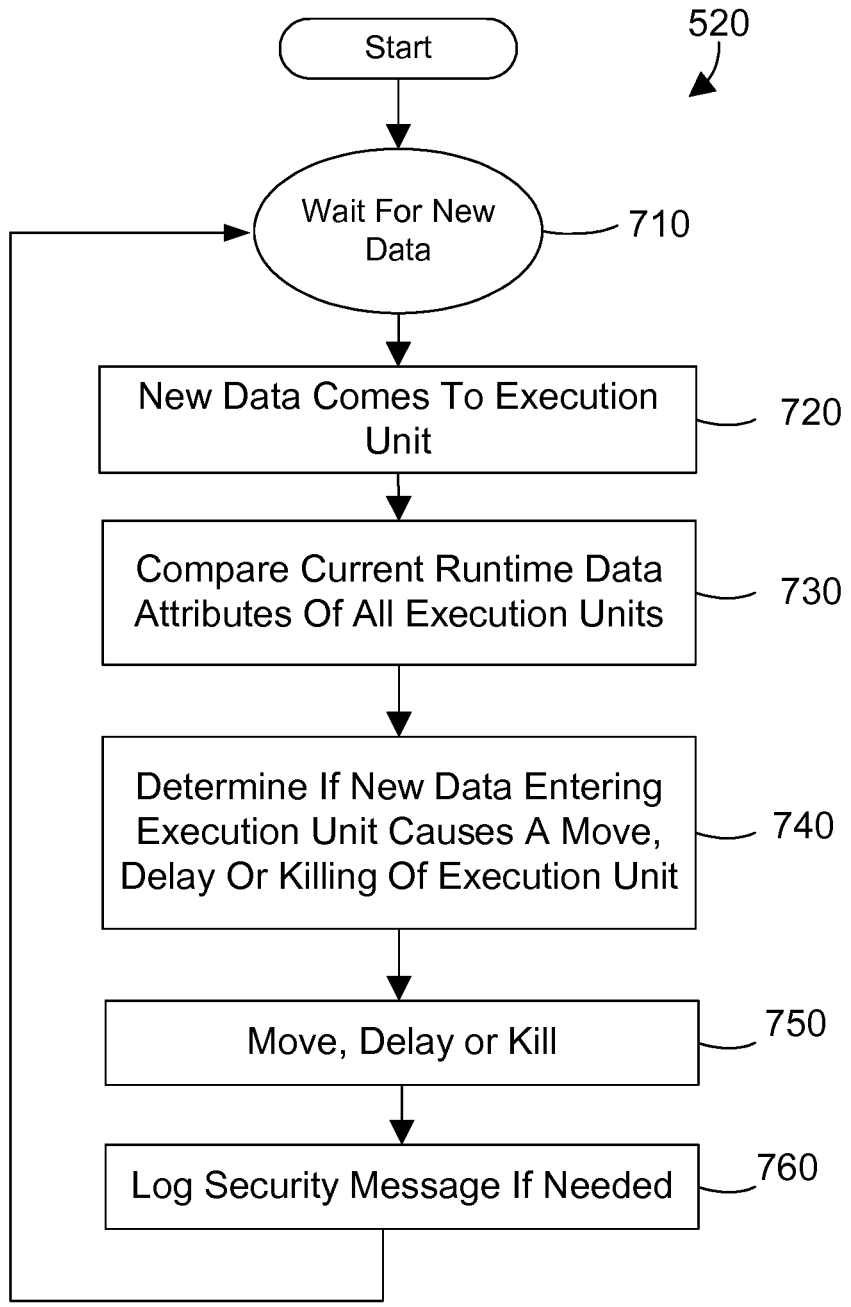
FIG. 7 is an example of a method flow diagram for monitoring execution unit data according to step 520 in FIG. 5.

FIG. 7 shows a method 520 for monitoring new data for security on the multi-nodal computer system. Method 520 is an example of performing the step 520 in FIG. 5 according to the examples described herein. The steps in method 520 are preferably performed by the security manager 124 (FIG. 1), but portions of the method may also be preferably performed by other software associated with the computer system. Method 520 is preferably performed in each node to examine data entering and/or leaving the node on the relevant multi-nodal system or portion of a system where security is being monitored by the security manager (step 710). When new data comes into the execution unit (step 720) then compare the current runtime data attributes of all the execution units with the data relationships in the data records for the data (step 730). Determine if the data entering the execution unit indicates a security violation that necessitates moving, delaying or killing of the execution unit (step 740). Take the appropriate action, i.e. move, delay or kill the execution unit (step 750). Steps taken to move, delay or kill the execution unit in step 750 may be accomplished in a similar manner as shown in FIG. 6 beginning with step 680. Next, log a security message if needed (step 760) and return to step 710.

Figure 8:
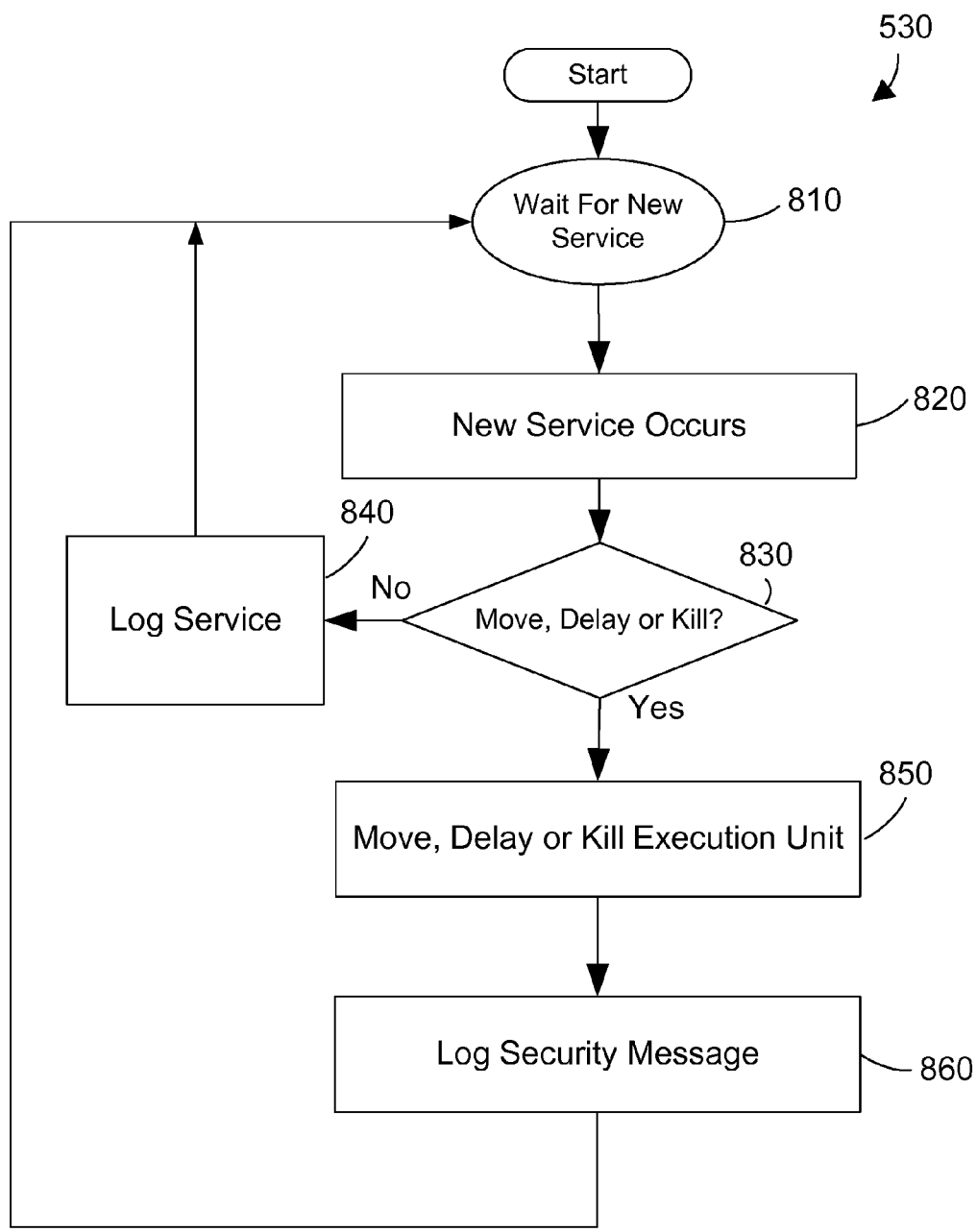
FIG. 8 is an example of a method flow diagram for monitoring execution unit services according to step 530 in FIG. 5.

FIG. 8 shows a method 530 for monitoring new services used by an execution unit for provide security on the multi-nodal computer system. Method 530 is an example of performing the step 530 in FIG. 5 according to the examples described herein. The steps in method 530 are preferably performed by the security manager 124 (FIG. 1), but portions of the method may are also preferably performed by other software associated with the computer system. Method 530 is preferably performed in each node to examine services used by an execution unit on the relevant multi-nodal system where security is being monitored by the security manager (step 810). When a new service occurs or is called by an execution unit (step 820) then determine if the new service called or used by the execution unit is allowed as within the services relationships in the security data records or whether to move, delay or kill the execution unit (step 830). If the new service does not require moving, delaying or killing of the execution unit (step 830=no) then log the service (step 840) and return to step 810. Determine if the new service requires the execution unit to move, delay or kill the execution unit (step 830=yes) then take the appropriate action, i.e. move, delay or kill the execution unit (step 850). Log a security message as appropriate (step 860) and return to step 810.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, a multi-nodal security manager enforces processing constraints stored as security relationships that control how different pieces of a multi-nodal application (called execution units) are allowed to execute to insure data security. The disclosure describes a security manager which provides a new security architecture for a distributed environment.

One skilled in the art will appreciate that many variations are possible within the scope of the claims. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:

1. An article of manufacture comprising software stored on nontransitory computer readable storage medium, the software comprising:
   a security manager that enforces security of data on a plurality of execution units of a multi-nodal computer system by managing the execution of an execution unit of the plurality of execution units depending on relationship records; and
   wherein the relationship records include a time relationship to indicate whether the execution unit can execute within a given time period with another execution unit of the plurality of execution units;
   wherein the time period is zero such that the time relationship indicates that the execution unit cannot run concurrently with the another execution unit;
   wherein the relationship records includes a data relationship to indicate whether the execution unit can execute depending on data currently in use in at least one of the plurality of running execution units; and
   wherein the relationship records include a services relationship to indicate whether the execution unit can execute depending on a service request in at least one of the plurality of running execution units.

2. The article of manufacture of claim 1 wherein the security manager determines there is a security violation to run the execution unit according to the relationship records and chooses an action from the following: moving the execution unit to another node, delaying the execution unit or killing the execution unit.

3. The article of manufacture of claim 1 wherein the plurality of compute nodes is a portion of a multi-nodal computer system chosen from the following: a combination of nodes, trunks, logical and physical machine breakdowns of nodes, locational breakdowns of nodes and IP breakdowns of nodes.

4. An apparatus comprising:
   a computer system comprising a plurality of compute nodes, each with a processor and a memory coupled to the processor;
   a plurality of running execution units in the memory of the compute nodes and executed by the processors of the compute nodes;
   a relationship record for each of the plurality of running execution units, where each relationship record includes a time relationship, a data relationship and a service relationship, wherein the time relationship indicates whether a first execution unit can execute within a given time period with at least one of the plurality of running execution units; and
   a security manager that enforces security of data on the computer system by managing the execution of the first execution unit and the plurality of running execution units depending on the relationship records;
   wherein the time period is zero such that the time relationship indicates that the execution unit cannot run concurrently with the another execution unit;
   wherein the data relationship indicates whether the first execution unit can execute depending on data currently in use in at least one of the plurality of running execution units; and
   wherein services relationship indicates whether the execution unit can execute depending on a service request in at least one of the plurality of running execution units.

5. The apparatus of claim 4 wherein the security manager determines there is a security violation to run the execution unit according to the relationship records and chooses an action from the following: moving the execution unit to another node, delaying the execution unit or killing the execution unit.

6. The apparatus of claim 4 wherein the plurality of compute nodes is a portion of a multi-nodal computer system chosen from the following:
   a combination of nodes, trunks, logical and physical machine breakdowns of nodes, locational breakdowns of nodes and IP breakdowns of nodes.

* * * * *